(12) United States Patent
Dunne et al.

(10) Patent No.: US 9,921,797 B2
(45) Date of Patent: *Mar. 20, 2018

(54) DISPLAYING USER ACTIVITY IN REAL-TIME COLLABORATIVE EDITING SYSTEMS

(71) Applicant: International Business Machines Corporation, Armonk, NY (US)

(72) Inventors: Jonathan Dunne, Dungarvan (IE); Ming Zhe Jiang, Beijing (CN); Hua Shao, Beijing (CN); Zhi Yong Xue, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 15/405,381

(22) Filed: Jan. 13, 2017

(65) Prior Publication Data
US 2017/0115950 A1 Apr. 27, 2017

Related U.S. Application Data

(63) Continuation of application No. 15/228,487, filed on Aug. 4, 2016, which is a continuation of application
(Continued)

(51) Int. Cl.
*G06F 7/24* (2006.01)
*G06F 3/14* (2006.01)
(Continued)

(52) U.S. Cl.
CPC ............. *G06F 3/1454* (2013.01); *G06F 7/24* (2013.01); *G06Q 10/101* (2013.01); *H04L 65/40* (2013.01); *G06F 3/04817* (2013.01); *G06F 17/24* (2013.01)

(58) Field of Classification Search
CPC ........ G06F 7/24; G06F 7/241; G06F 17/2288; G06F 17/3089; G06F 17/30873; G06Q 10/10; G06Q 10/101
(Continued)

(56) References Cited

U.S. PATENT DOCUMENTS 8,214,395 B2 7/2012 Stevens et al.
8,387,006 B1 2/2013 Taylor
(Continued)

OTHER PUBLICATIONS

IBM, List of IBM Patents or Patent Applications Treated as Related, Appendix P, dated Jan. 17, 2017, 2 pages.
(Continued)

*Primary Examiner* — Rinna Yi
(74) *Attorney, Agent, or Firm* — Aaron N. Pontikos (57) ABSTRACT

A computer-implemented method includes identifying a document that is operated upon by a real-time collaborative editing system. The document includes a first active region and additional active regions. The method identifies a first node and one or more additional nodes, all accessing the document via the real-time collaborative editing system. The method identifies a second node that is one of the one or more additional nodes. The method identifies a second active region, which is one of the additional active regions. The method identifies a first node view, which displays the first active region via the first node. The method identifies a second node view. The second node view displays the second active region via the second node. The method responds to input from the first node by creating a third node view that is displayed via the second active region and presented via the first node.

1 Claim, 6 Drawing Sheets

Related U.S. Application Data

No. 14/972,686, filed on Dec. 17, 2015, now Pat. No. 9,471,897, which is a continuation of application No. 14/855,906, filed on Sep. 16, 2015.

(51) Int. Cl.
    *H04L 29/06*     (2006.01)
    *G06Q 10/10*     (2012.01)
    *G06F 3/0481*     (2013.01)
    *G06F 17/24*     (2006.01)

(58) Field of Classification Search
    USPC .................................................. 715/255, 751
    See application file for complete search history.

(56) References Cited

U.S. PATENT DOCUMENTS

| | | | |
|---|---|---|---|
| 8,407,290 | B2 | 3/2013 | Abt, Jr. et al. |
| 9,471,897 | B1 | 10/2016 | Dunne et al. |
| 2008/0209327 | A1 | 8/2008 | Drucker et al. |
| 2010/0257457 | A1 | 10/2010 | De Goes |
| 2012/0110443 | A1 | 5/2012 | Lemonik et al. |
| 2013/0124978 | A1 | 5/2013 | Horns et al. |
| 2013/0159849 | A1 | 6/2013 | Lee et al. |
| 2013/0339847 | A1 | 12/2013 | Bartek et al. |
| 2015/0033140 | A1 | 1/2015 | Kuchoor |
| 2015/0199270 | A1 | 7/2015 | Day-Richter et al. |
| 2015/0199319 | A1 | 7/2015 | Newman et al. |

OTHER PUBLICATIONS

"Google Docs—More than letters and words", pp. 1-5, printed on Aug. 5, 2015, <https://www.google.com/intl/en/docs/about/>.

"Public Files", IBM Connections, pp. 1-2, printed on Aug. 5, 2015, <https://connections.swg.usma.ibm.com/files/app#/>.

"Sign in to Office 365", Office 365, 1 page, © 2015 Microsoft, printed on Aug. 5, 2015, <https://login.microsoftonline.com/login.srf?bk=1416194228>.

Dunne et al., "Displaying User Activity in Real-Time Collaborative Editing Systems", U.S. Appl. No. 14/855,906, filed on Sep. 16, 2015, 25 pages.

Dunne et al., "Displaying User Activity in Real-Time Collaborative Editing Systems", U.S. Appl. No. 15/228,487, filed on Aug. 4, 2016, 22 pages.

DISPLAYING USER ACTIVITY IN REAL-TIME COLLABORATIVE EDITING SYSTEMS

BACKGROUND

The present invention relates generally to the field of real-time collaborative editing systems, and more particularly to user interface display enhancements for real-time collaborative editing systems.

In real-time collaborative editing systems, users can edit the same file simultaneously. Real-time collaborative editing systems allow multiple users to view files, edit files, and see edits by other users simultaneously. Real-time collaborative editing systems are often accessed via web browsers. Such web browsers display files or portions of files via the viewport. Often, files are larger than can be seen clearly in one viewport, requiring a user to scroll to see other portions of a document. Users continue to face challenges when multiple users are editing different portions of a document simultaneously.

SUMMARY

A computer-implemented method includes identifying a document. The document is operated upon by a real-time collaborative editing system. The document includes a first active region and one or more additional active regions. The method identifies a first node and one or more additional nodes. The first node and the one or more additional nodes accessing the document via the real-time collaborative editing system. The method identifies a second node. The second node is one of the one or more additional nodes. The method identifies a second active region. The second active region is one of the one or more additional active regions. The method identifies a first node view. The first node view displays the first active region via the first node. The method identifies a second node view. The second node view displays the second active region via the second node. The method responds to input from the first node by creating a third node view. The third node view displays the second active region. The method presents the third node view via the first node.

DETAILED DESCRIPTION

Figure 1:
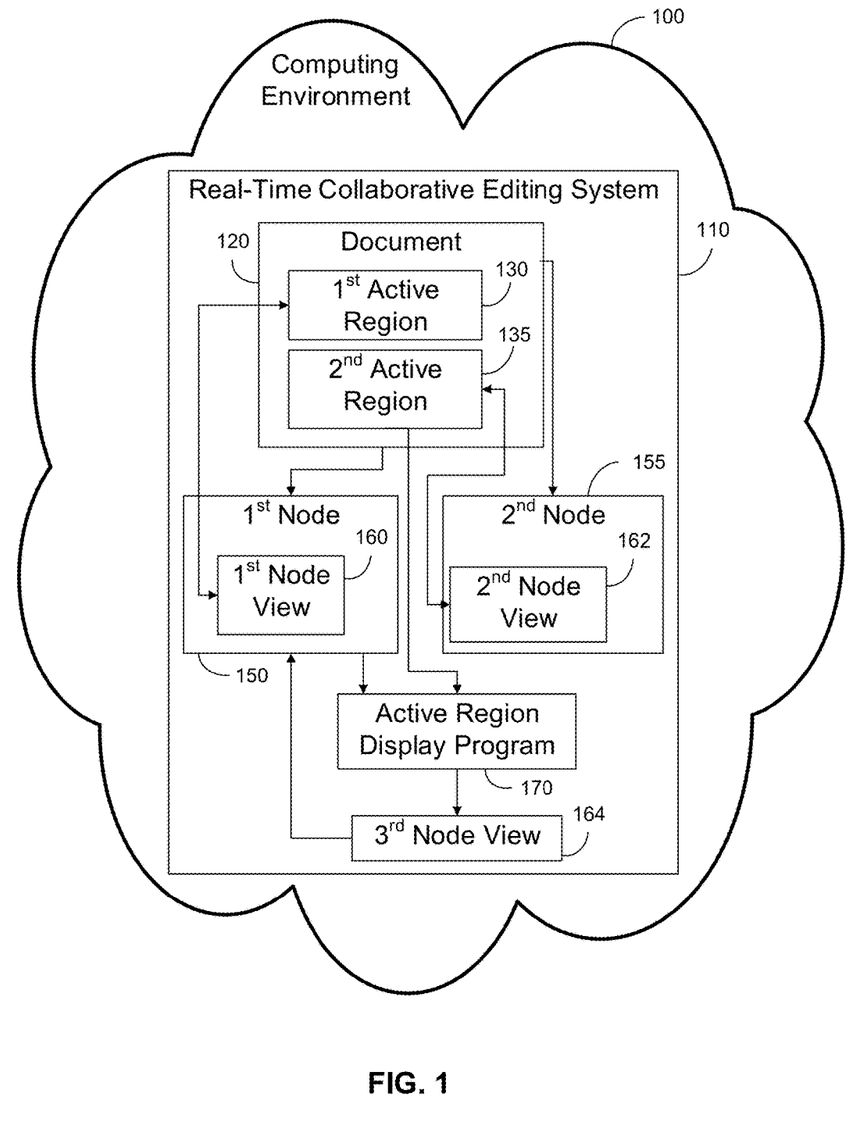
FIG. 1 is a block diagram of a computing environment suitable for operation of an active region display program, in accordance with at least one embodiment of the invention.

Referring now to the invention in more detail, FIG. 1 is a block diagram displaying an exemplary computing environment suitable for operation of at least one embodiment of the invention. A computing environment 100 includes a real-time collaborative editing system 110, a document 120, a first active region 130, a second active region 135, a first node 150, a second node 155, a first node view 160, a second node view 162, an active region display program 170, and a third node view 164, all in mutual electronic communication and interconnected within the computing environment 100. The computing environment 100 may be a cloud-based, virtual, or distributed environment or a remote environment on defined server hardware, or, more generally, the computing environment 100 may be any type of environment suitable for simultaneous access by multiple users of the real-time collaborative editing system 110.

The active region display program 170 may generate the third node view 164. A node, such as the first node 150 or the second node 155, may display the third node view 164. The first node 150 includes a first node view 160. The active region display program 170 may receive input from the first node 150 and second active region 135 and generate the third node view 164 as output. The active region display program 170 may send the third node view 164 to the first node 150.

The real-time collaborative editing system 110 is a collaborative software application that stores files, and allows multiple nodes to access, view, and edit the files, and allows the multiple nodes to view edits made by other nodes in real-time. The real-time collaborative editing system 110 may store, access, and/or edit the document 120. The real-time collaborative editing system 110 may enable multiple nodes, such as the first node 150 and the second node 155 to access, view, and edit the document 120.

The document 120 is an entity of data available to nodes, such as the first node 150 and the second node 155, within the real-time collaborative editing system 110 that is capable of being manipulated as an entity. For example, the document 120 may be a word processing document or a spreadsheet. The document 120 may be stored on and/or accessed via the real-time time collaborative editing system 110. The document 120 contains regions, including the first active region 130 and the second active region 135. In some embodiments, the first active region 130 is a page or page-like portion of the document and the second active region 135 is a different page or page-like portion of the document. In other embodiments the first active region 130 and the second active region 135 refer to a same portion of the document 120. In general, the first active region 130 may be understood as a portion of the document 120 that is displayed via the first node view 160. In general, the second active region 135 may be understood as a portion of the document 120 wherein the document 120 is displayed via the second node view 162.

The first node 150 is a client computing device. The first node 150 may be, for example, a personal computer, desktop computer, laptop computer, netbook computer, tablet computer, personal digital assistant (PDA), smart phone, or other computation and/or communication device. In general, the first node 150 may be understood as any electronic device or computing system capable of processing program instructions, sending and receiving data information, and communicating with the document 120 and the active region display program 170 via the real-time collaborative editing system 110 within the computing environment 100. The first node 150 may display the first active region 130 via first node view 160. The first node view 160 may also send input to the first active region 130 to edit the first active region 130 via the real-time collaborative editing system 110. The second node 155 is a device similar to the first node 150. The second node 155 may display the second active region 135 via the second node view 162.

The first node view 160 is a viewport. The first node view 160 may be a rectangular area expressed in rendering-device-specific coordinates. For example, the first node view 160 may be expressed in pixels for screen coordinates, by which the first active region 130 is rendered. The first node view 160 is may display the first active region 130, the second active region 135 and any other portion of the document 120. In some embodiments, the first node view 160 is a generic web browser. The second node view 162 and the third node view 164 are viewports similar to the first node view 160.

The active region display program 170 receives input from at least two nodes, such as the first node 150 and the second node 155 and is capable of sending output to the at least one node within the real-time collaborative editing system 110. The active region display program 170 may receive the second active region 135 as input and generate the third node view 164 as output. The active region display program 170 may return the third node view 164 to the first node 150. The active region display program 170 may be a dedicated real-time collaborative editing system program, a function integrated within another program, or any program or function that can communicate with the first node 150 and the second active region 135 via a real-time collaborative editing system.

Figure 2:
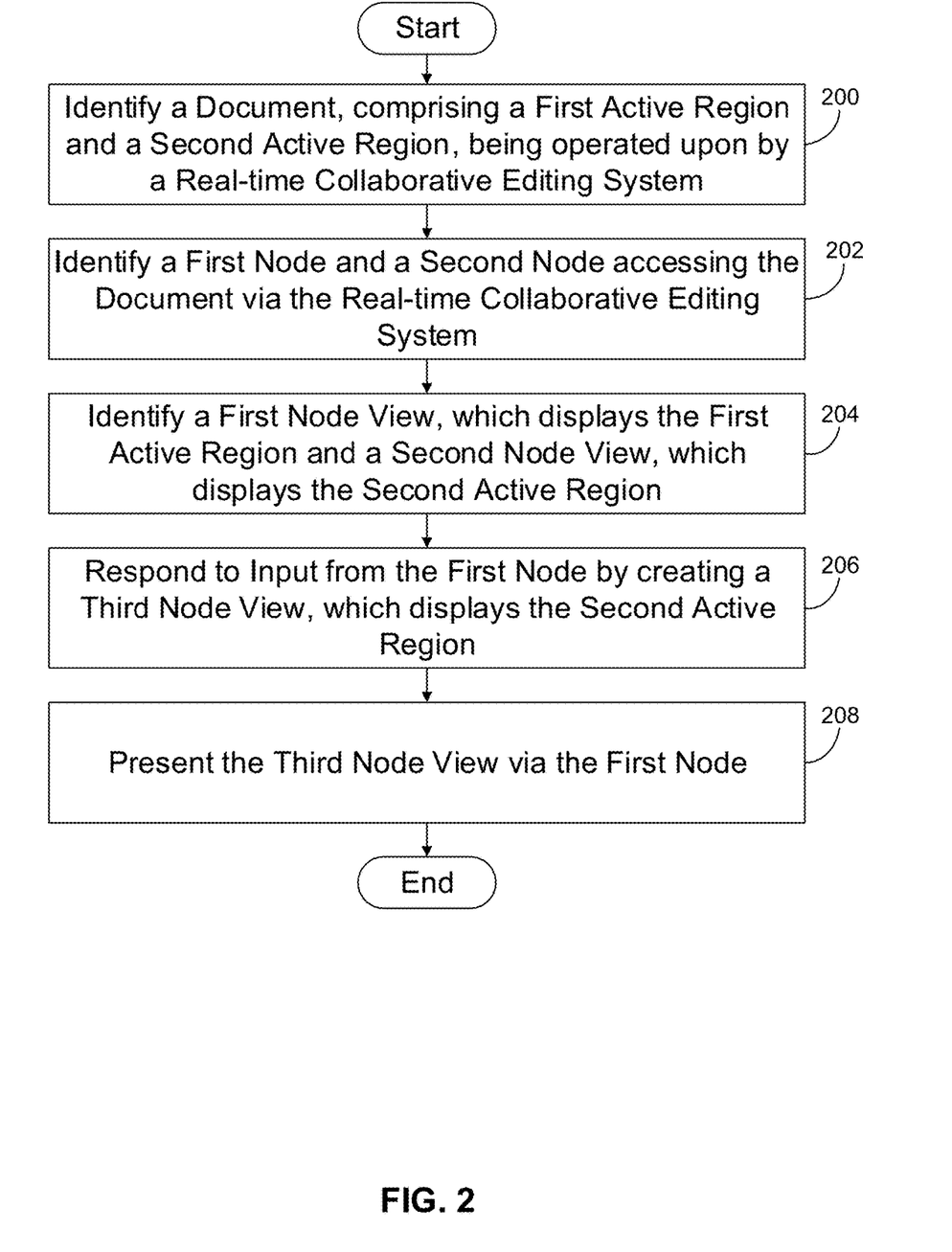
FIG. 2 is a flowchart depicting operational steps for an active region display program, in accordance with at least one embodiment of the present invention.

FIG. 2 is a flowchart depicting the operational steps of the active region display program 170 executing within the computing environment 100 of FIG. 1, in accordance with an embodiment of the present invention.

At step 200, the active region display program 170 identifies the document 120 within the real-time collaborative editing system 110. The document 120 includes the first active region 130 and the second active region 135. The document 120 may also include one or more additional active regions. At step 200, the active region display program 170 identifies active regions within the document 120 including the first active region 130 and the second active region 135. Identifying may include automated calls to the active region display program 170, for example, from an integrated development environment or as part of the real-time collaborative editing system 110.

At step 202, the active region display program 170 identifies the first node 150 and the second node 155. In some embodiments, the active region display program 170 identifies the first node 150, the second node 155, and one or more additional nodes, all within the real-time collaborative editing system 110 and all accessing the document 120.

At step 204, the active region display program 170 identifies the first node view 160, which displays the first active region 130 identified at step 200, and identifies the second node view 162, which displays the second active region 135.

At step 206, the active region display program 170 responds to input from the first node 150, by generating the third node view 164, which displays the second active region 135. The third node view is created in response to input from the first node 150. In some embodiments the input may include a user selecting an icon via the first node 150 or the first node view 160.

At step 208, the active region display program 170 presents the third node view 164 via the first node 150. The active region display program 170 may complete step 208 by presenting the third node view 164 via the first node. The active region display program 170 may present the third node view 164 as a pop-up window (see, e.g. FIG. 3). The pop-up window may be displayed in front of the first node view 160, where both the third node view 164 and the first node view 160 are displayed via the first node 150. Further, in some embodiments, the second active region 135 is editable via the third node view 164. For example, the third node view 164 may display the second active region 135 via the first node 150. The first node 150 may edit the second active region 135 via the third node view. Changes made via the third node view 164 changes the second active region 135 via the real-time collaborative editing system 110.

In some embodiments, the active region display program 170 may display each of the active regions identified at step 200 as display artefacts within a node view such as the first node view 160, the second node view 162, and/or the third node view 164. For example, the display artefacts may be a line number for each of the active regions identified at step 200. The display artefact may illustrate a width and a height for each of the active regions identified at step 200 as compared to a width and a height for the document identified at step 200. In such embodiments, the active region display program 170 may identify a location for each active region within the real-time collaborative editing system 110. In some embodiments, the display artefacts may be thumbnail images (see, e.g. FIG. 4). The thumbnail images may be displayed at the top of a node view such as the first node view 160. In other embodiments, the thumbnail images may be displayed along a scroll bar within the node view. In some embodiments, selecting the thumbnail images may be the input that the active region display program 170 responds to at step 206.

Figure 5:
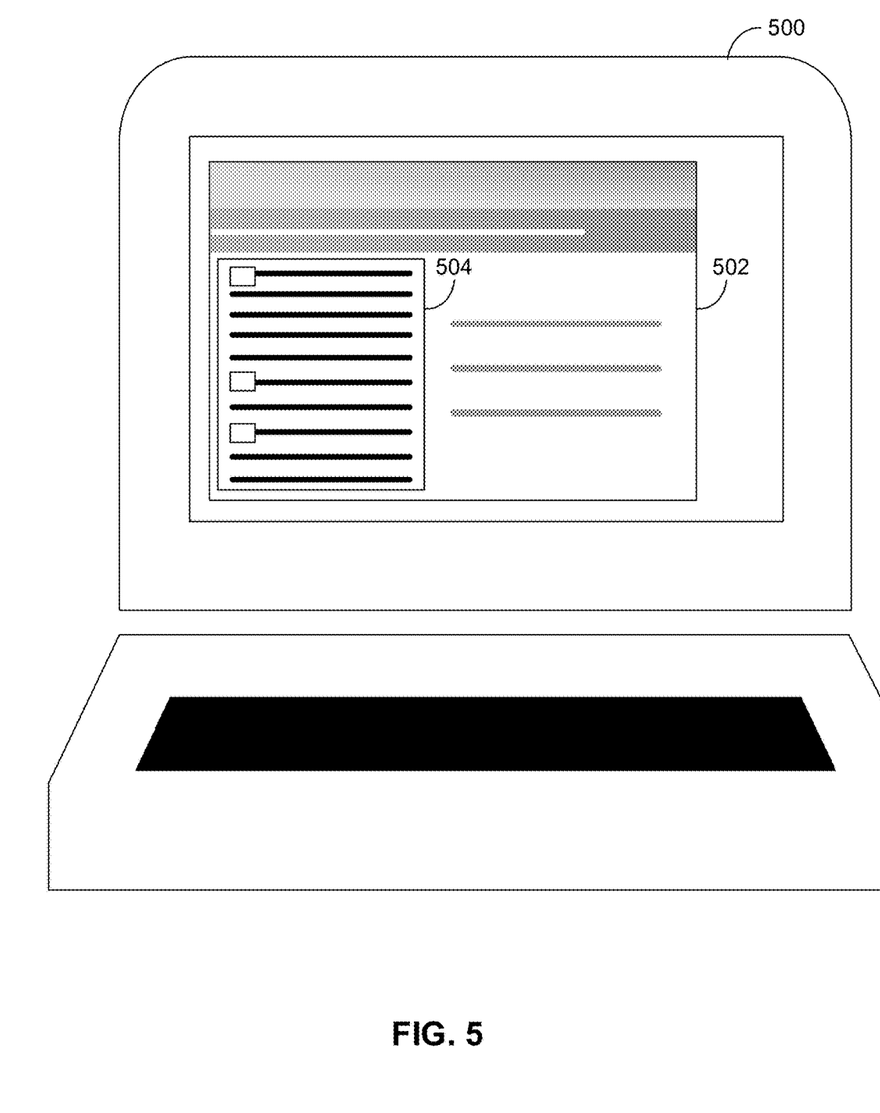
FIG. 5 is an exemplary illustration of a user interface created by the display program of a document map, in accordance with at least one embodiment of the present invention.

In some embodiments, the active region display program 170 the display artefacts may be presented within a node view, such as the first node view 160 as a document map (see, e.g. FIG. 5). The document map may illustrate a document, such as the document 120 and indicate active regions, such as the first active region 130 and the second active region 135. The document map may presented as a sidebar within a node view such as the first node view 160. In other embodiments, the document map may be another node view, that is also a viewport and similar to the first node view 160. In such an embodiment, the document map may be displayed and hidden responsive to input such as a user selecting to view or hide the document map.

Figure 3:
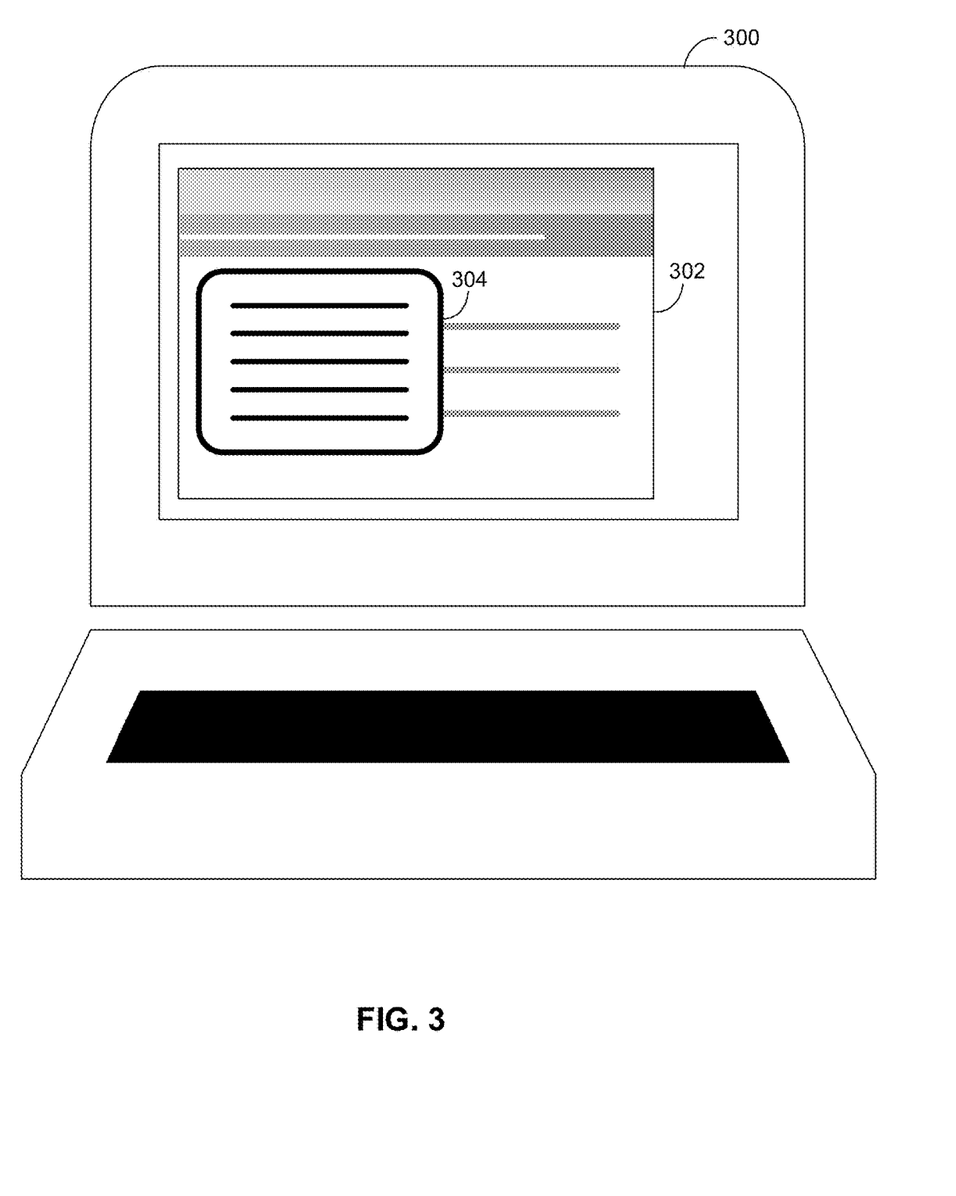
FIG. 3 is an exemplary illustration of a user interface created by the display program of a pop-up window, in accordance with at least one embodiment of the present invention.

FIG. 3 is an exemplary illustration of a user interface of the active region display program 170, in accordance with at least one embodiment of the present invention. FIG. 3 includes an example node 300, an example node view 302, and an example pop-up window 304. The example node 300 is a node similar to the first node 150. The example node 300 displays the example node view 302 similar to the first node 150 displaying the first node view 160. In this example, the example node 300 is a laptop computer, as shown, and the example node view 302 is a web browser, as shown.

The example pop-up window 304 is generated by the active region display program 170. The example pop-up window 304 is a node view similar to the third node view 164. In FIG. 3, the horizontal lines illustrated within the example node view 302 and within the example pop-up window 304 represent the text of a document, such as the document 120. The text from a document displayed via the example pop-up window 304 is an active region within the document and the text from a document displayed via the example node view 302 is an active region with the same document. Both active regions may be editable within a real-time collaborative editing system such as the real-time collaborative editing system 110.

Figure 4:
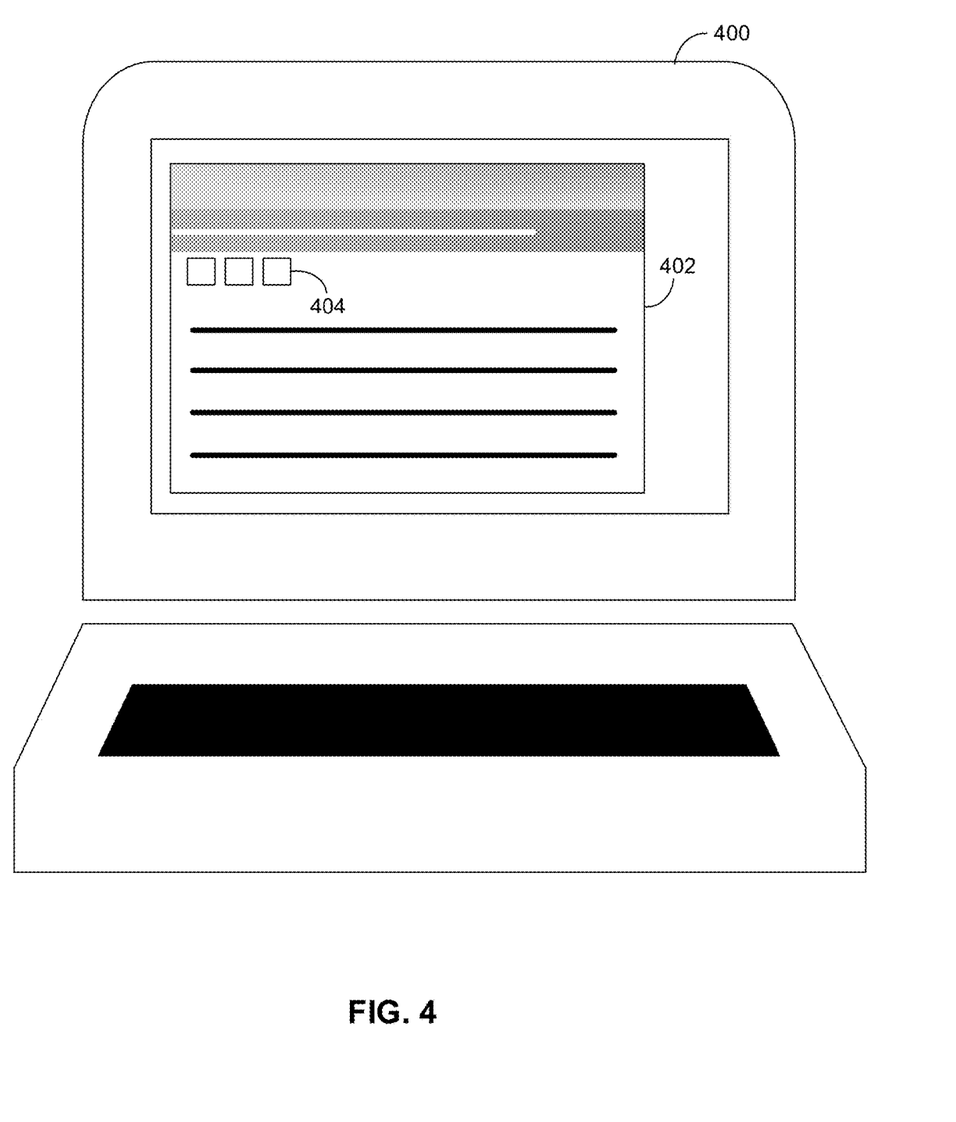
FIG. 4 is an exemplary illustration of a user interface created by the display program of thumbnail icons, in accordance with at least one embodiment of the present invention.

FIG. 4 is an exemplary illustration of a user interface of the active region display program 170, in accordance with at least one embodiment of the present invention. FIG. 4 includes an example node 400, an example node view 402, and an example thumbnail image 404. The example node 400 is similar to the first node 150 and the example node view 402 is similar to the first node view 160. The example thumbnail image 404 is a display artefact corresponding to an active region within a document.

FIG. 5 is an exemplary illustration of a user interface of the active region display program 170, in accordance with at least one embodiment of the present invention. FIG. 5 include an example node 500, an example node view 502, and an example document map 504. The example node 500 is similar to the first node 150 and the example node view 502 is similar to the first node view 160. The example document map 504 is a display artefact corresponding to active regions within a document. In FIG. 5, the horizontal lines illustrated within the example document map 504 represent the text of an entire document. The rectangular icons illustrated within the example document map 504 indicate active regions within the document. In FIG. 5, the document includes three active regions displayed via three node views (not shown).

Figure 6:
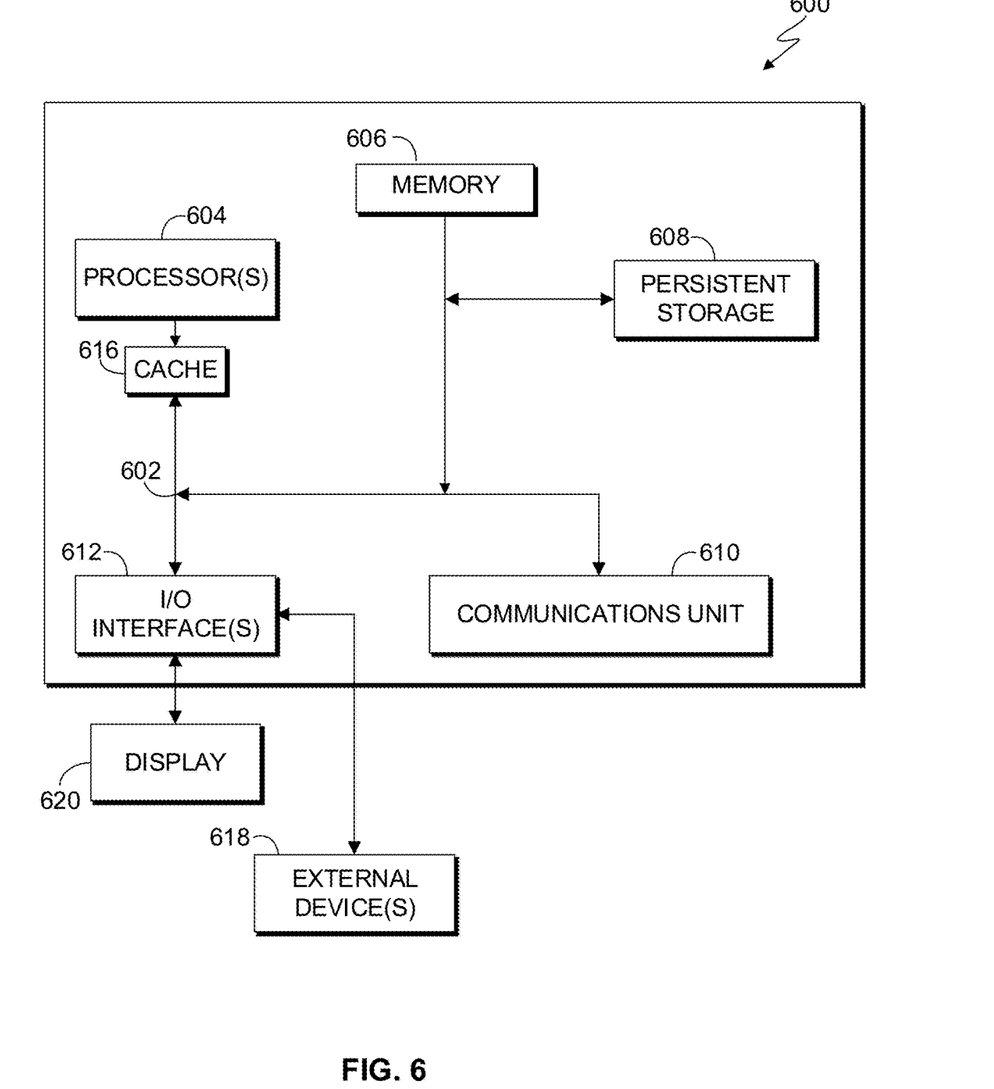
FIG. 6 is a block diagram of components of a computing apparatus suitable for executing the display program, in accordance with at least one embodiment of the present invention.

FIG. 6 is a block diagram depicting components of a computer 600 suitable for executing the active region display program 170. FIG. 6 displays the computer 600, the one or more computer processor(s) 604 (including one or more computer processors), the communications fabric 602, the memory 606, the RAM, the cache 616, the persistent storage 608, the communications unit 610, the I/O interface(s) 612, the display 620, and the external devices 618. It should be appreciated that FIG. 6 provides only an illustration of one embodiment and does not imply any limitations with regard to the environments in which different embodiments may be implemented. Many modifications to the depicted environment may be made.

As depicted, the computer 600 operates over a communications fabric 602, which provides communications between the cache 616, the computer processor(s) 604, the memory 606, the persistent storage 608, the communications unit 610, and the input/output (I/O) interface(s) 612. The communications fabric 602 may be implemented with any architecture suitable for passing data and/or control information between the computer processor(s) 604 (e.g. microprocessors, communications processors, and network processors, etc.), the memory 606, the external devices 618, and any other hardware components within a system. For example, the communications fabric 602 may be implemented with one or more buses or a crossbar switch.

The memory 606 and persistent storage 608 are computer readable storage media. In the depicted embodiment, the memory 606 includes a random access memory (RAM). In general, the memory 606 may include any suitable volatile or non-volatile implementations of one or more computer readable storage media or one or more computer readable media. The cache 616 is a fast memory that enhances the performance of computer processor(s) 604 by holding recently accessed data, and data near accessed data, from memory 606.

Program instructions for the active region display program 170 may be stored in the persistent storage 608 or in memory 606, or more generally, any computer readable storage media, for execution by one or more of the respective computer processor(s) 604 via the cache 616. The persistent storage 608 may include a magnetic hard disk drive. Alternatively, or in addition to a magnetic hard disk drive, the persistent storage 608 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of the persistent storage 608.

The communications unit 610, in these examples, provides for communications with other data processing systems or devices. In these examples, the communications unit 610 may include one or more network interface cards. The communications unit 610 may provide communications through the use of either or both physical and wireless communications links. The active region display program 170 may be downloaded to the persistent storage 608 through the communications unit 610. In the context of some embodiments of the present invention, the source of the various input data may be physically remote to the computer 600 such that the input data may be received and the output similarly transmitted via the communications unit 610.

The I/O interface(s) 612 allows for input and output of data with other devices that may operate in conjunction with the computer 600. For example, the I/O interface(s) 612 may provide a connection to the external devices 618, which may include a keyboard, keypad, a touch screen, and/or some other suitable input devices. External devices 618 may also include portable computer readable storage media, for example, thumb drives, portable optical or magnetic disks, and memory cards. Software and data used to practice embodiments of the present invention may be stored on such portable computer readable storage media and may be loaded onto the persistent storage 608 via the I/O interface(s) 612. The I/O interface(s) 612 may similarly connect to a display 620. The display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system comprising:
   one or more computer processors;
   one or more computer hardware storage devices and computer program instructions;
   said computer program instructions being stored on said computer hardware storage devices for execution by at least one of said one or more processors, said computer program instructions comprising instructions to:

identify a document, said document being operated upon by a real-time collaborative editing system, said document comprising a first active region and one or more additional active regions;

identify a first node and one or more additional nodes, said first node and said one or more additional nodes accessing said document via said real-time collaborative editing system, said first node and said one or more additional nodes being distinct devices;

identify a second node, said second node being one of said one or more additional nodes;

identify a second active region, said second active region being one of said one or more additional active regions, said second active region being the portion of said document being displayed via said second node view;

identify a first node view, said first node view displaying said first active region via said first node, said first active region being the portion of said document being displayed via said first node view;

identify a second node view, said second node view displaying said second active region via said second node;

responsive to input, wherein said input comprises selecting an icon, from said first node, create a third node view, said third node view displaying said second active region of the second node within the first active region of the first node and edits being made via said second node;

present said third node view via said first node by:
   generating a pop-up window, said third node view being displayed via said pop-up window, said second active region being editable via said pop-up window, said pop-up window displaying said document in its entirety and one or more icons, wherein said pop-up window is said third node view, wherein each of said one or more icons represents one of said first active region of the first node, said second active region of the second node, or any of said one or more additional active regions of the distinct devices; and
   presenting said pop-up window via said first node; and
   for each of said one or more additional active regions, display that of said one or more additional active regions as a display artefact via said first node view;

and, wherein:
   said first node and each of said one or more additional nodes comprise a web browser;
   said second active region is editable via said third node view; and
   said display artefact comprises at least one of a document map or a thumbnail image.

* * * * *